(12) United States Patent
Doherty et al.

(10) Patent No.: US 10,595,216 B2
(45) Date of Patent: Mar. 17, 2020

(54) MONITORING OF CHANNEL STABILITY AND INTERFERENCE IN WIRELESS NETWORKS

(71) Applicant: Linear Technology Corporation, Milpitas, CA (US)

(72) Inventors: Lance Robert Doherty, San Leandro, CA (US); William Alan Lindsay, El Cerrito, CA (US); Jonathan Noah Simon, Castro Valley, CA (US); Alain Pierre Levesque, Pleasanton, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 15/886,754

(22) Filed: Feb. 1, 2018

(65) Prior Publication Data

US 2018/0160321 A1 Jun. 7, 2018

Related U.S. Application Data

(63) Continuation of application No. 13/866,751, filed on Apr. 19, 2013.

(51) Int. Cl.
*H04W 24/02* (2009.01)
*H04W 24/04* (2009.01)
*H04W 84/18* (2009.01)

(52) U.S. Cl.
CPC .......... *H04W 24/02* (2013.01); *H04W 24/04* (2013.01); *H04W 84/18* (2013.01)

(58) Field of Classification Search
CPC ..... H04W 24/02; H04W 24/04; H04W 84/18; H04W 24/10; H04W 72/1226;
(Continued)

(56) References Cited

U.S. PATENT DOCUMENTS 7,376,122 B2 * 5/2008 Draves, Jr. .............. H04L 45/02
370/351
7,440,393 B2 * 10/2008 Nilakantan ......... H04L 43/0811
370/216
(Continued)

FOREIGN PATENT DOCUMENTS

EP 2802167 A2 11/2014
WO WO-2009/046143 A2 4/2009

OTHER PUBLICATIONS

Extended European Search Report issued in Application No. 14001424.2 dated Jan. 3, 2015.
(Continued)

*Primary Examiner* — Man U Phan
(74) *Attorney, Agent, or Firm* — Schwegman Lundberg & Woessner, P.A.

(57) ABSTRACT

The stability of a channel in a wireless network is evaluated at a node. Upon transmitting a packet from the node on a network channel, a first counter associated with the channel is incremented. Upon receiving an acknowledgment packet responsive to the transmitted packet, a second counter associated with the channel is incremented. A stability metric for the channel is computed based on values stored in the first and second counters. Additionally, interference on a channel of the network is measured at a node. Upon determining that no packet is received during a predetermined time-period on the channel, a received signal strength (RSS) is measured on the channel at an end of the predetermined time-period. Alternatively, upon determining that a packet is received during the predetermined time-period on the channel, the RSS is measured on the channel following completion of the transmission of the packet on the channel.

20 Claims, 8 Drawing Sheets

(58) Field of Classification Search
CPC ........... H04W 52/0241; H04W 56/001; H04W 8/005; H04W 72/085; H04L 47/10; H04L 45/02; H04B 17/309; H04B 7/155; H04B 17/24
USPC .......................................................... 370/252
See application file for complete search history.

(56) References Cited

U.S. PATENT DOCUMENTS

| | | | | |
|---|---|---|---|---|
| 7,532,598 | B2* | 5/2009 | Choi | H04L 45/00 370/332 |
| 7,561,546 | B2* | 7/2009 | Marinier | H04B 17/309 370/329 |
| 7,623,459 | B2* | 11/2009 | Yang | H04L 47/10 370/229 |
| 7,697,450 | B2* | 4/2010 | D'Amico | H04B 7/155 370/252 |
| 7,740,393 | B2 | 6/2010 | Shiau et al. | |
| 7,830,856 | B2 | 11/2010 | Boetzel et al. | |
| 7,911,962 | B2* | 3/2011 | Khuu | H04L 45/125 370/238 |
| 8,111,618 | B2* | 2/2012 | Li | H04L 43/50 370/229 |
| 8,189,479 | B1* | 5/2012 | Doherty | H04L 47/27 370/232 |
| 8,391,251 | B2 | 3/2013 | Sun et al. | |
| 8,406,701 | B2 | 3/2013 | Singh et al. | |
| 8,565,114 | B2 | 10/2013 | Hottinen | |
| 8,737,244 | B2* | 5/2014 | Rotvold | H04B 17/24 370/252 |
| 8,798,084 | B2* | 8/2014 | Pratt, Jr. | G01D 21/00 370/406 |
| 8,830,847 | B1 | 9/2014 | Doherty et al. | |
| 9,036,612 | B2 | 5/2015 | Gidlund et al. | |
| 9,125,097 | B2* | 9/2015 | Salonidis | H04W 24/10 |
| 9,232,522 | B2 | 1/2016 | Khoo et al. | |
| 9,294,942 | B2 | 3/2016 | Salonidis et al. | |
| 9,350,464 | B2 | 5/2016 | Singh et al. | |
| 9,426,763 | B2* | 8/2016 | Wentink | H04W 56/001 |
| 9,699,815 | B2 | 7/2017 | Law et al. | |
| 9,763,112 | B2* | 9/2017 | Thomas | H04W 72/085 |
| 10,123,296 | B2 | 11/2018 | Zhang | |
| 2004/0264372 | A1* | 12/2004 | Huang | H04L 45/00 370/230 |
| 2006/0067282 | A1 | 3/2006 | Sherman et al. | |
| 2006/0281467 | A1 | 12/2006 | Kim et al. | |
| 2009/0213740 | A1 | 8/2009 | Ganguly et al. | |
| 2010/0144347 | A1* | 6/2010 | Yamamoto | H04W 52/0241 455/434 |
| 2010/0254364 | A1* | 10/2010 | Yi | H04W 72/1226 370/338 |
| 2010/0265891 | A1* | 10/2010 | Belcea | H04L 47/10 370/328 |
| 2010/0315986 | A1 | 12/2010 | Lee et al. | |
| 2012/0134280 | A1 | 5/2012 | Rotvold et al. | |
| 2013/0070629 | A1* | 3/2013 | Park | H04L 1/0001 370/252 |
| 2013/0076629 | A1 | 3/2013 | Lin et al. | |
| 2014/0313909 | A1 | 10/2014 | Doherty et al. | |
| 2016/0135070 | A1* | 5/2016 | Lee | H04L 5/0053 370/252 |
| 2017/0303323 | A1* | 10/2017 | Law | H04W 8/005 |

OTHER PUBLICATIONS

Conti, M. et al., "Performability in Ad Hoc Networks," IEEE, 2004, pp. 2106-2110.

Partial European Search Report issued in corresponding European Application No. 14001424.2, dated Sep. 16, 2014.
S.Han, et al., "Reliable and Real-Time Communication in Industrial Wireless Mesh Networks," Proc. 17th IEEE Real-Time Embedded Technol. Appl. Symp. (RTAS), 2011.
U.S. Appl. No. 13/866,751, filed Apr. 19, 2013, Monitoring of Channel Stability and Interference in Wireless Networks.
"U.S. Appl. No. 13/866,751, 312 Amendment filed Jan. 2, 2018", 9 pgs.
"U.S. Appl. No. 13/866,751, Decision from Pre-Appeal Brief mailed Oct. 26, 2018", 2 pgs.
"U.S. Appl. No. 13/866,751, Examiner Interview Summary dated May 14, 2018", 3 pgs.
"U.S. Appl. No. 13/866,751, Examiner Interview Summary dated Aug. 28, 2018", 4 pgs.
"U.S. Appl. No. 13/866,751, Final Office Action dated Jun. 5, 2018", 10 pgs.
"U.S. Appl. No. 13/866,751, Final Office Action dated Jun. 30, 2017", 12 pgs.
"U.S. Appl. No. 13/866,751, Final Office Action dated Oct. 20, 2016", 11 pgs.
"U.S. Appl. No. 13/866,751, Non Final Office Action dated Feb. 7, 2018", 14 pgs.
"U.S. Appl. No. 13/866,751, Non Final Office Action dated Mar. 3, 2017", 12 pgs.
"U.S. Appl. No. 13/866,751, Non Final Office Action dated Apr. 18, 2016", 11 pgs.
"U.S. Appl. No. 13/866,751, Non Final Office Action dated Dec. 14, 2018", 11 pgs.
"U.S. Appl. No. 13/866,751, Notice of Allowance dated Oct. 2, 2017", 9 pgs.
"U.S. Appl. No. 13/866,751, Pre-Appeal Brief Request filed Sep. 5, 2018", 6 pgs.
"U.S. Appl. No. 13/866,751, Response filed Jan. 23, 2017 to Final Office Action dated Oct. 20, 2016", 14 pgs.
"U.S. Appl. No. 13/866,751, Response filed Feb. 4, 2016 to Restriction Requirement dated Dec. 16, 2015", 2 pgs.
"U.S. Appl. No. 13/866,751, Response filed May 4, 2018 to Non Final Office Action dated Feb. 7, 2018", 12 pgs.
"U.S. Appl. No. 13/866,751, Response filed Jun. 1, 2017 to Non Final Office Action dated Mar. 3, 2017", 16 pgs.
"U.S. Appl. No. 13/866,751, Response filed Jul. 6, 2016 to Non Final Office Action dated Apr. 18, 2016", 10 pgs.
"U.S. Appl. No. 13/866,751, Response filed Sep. 5, 2017 to Final Office Action dated Jun. 30, 2017", 9 pgs.
"U.S. Appl. No. 13/866,751, Restriction Requirement dated Dec. 16, 2015", 5 pgs.
"European Application Serial No. 14001424.2, Communication Pursuant to Article 94(3) EPC dated Feb. 14, 2017", 6 pgs.
"European Application Serial No. 14001424.2, Communication Pursuant to Article 94(3) EPC dated Jun. 13, 2018", 5 pgs.
"European Application Serial No. 14001424.2, Response filed Jun. 23, 2017 to Communication Pursuant to Article 94(3) EPC dated Feb. 14, 2017", 14 pgs.
"European Application Serial No. 14001424.2, Response filed Aug. 21, 2015 to Extended European Search Report dated Jan. 23, 2015", 21 pgs.
"European Application Serial No. 14001424.2, Response filed Oct. 8, 2018 to Communication Pursuant to Article 94(3) EPC dated Jun. 13, 2018", w/ English Claims, 19 pgs.
"U.S. Appl. No. 13/866,751, Final Office Action dated May 13, 2019", 14 pgs.
"U.S. Appl. No. 13/866,751, Office Action Response filed on Mar. 14, 2019", 11 Pgs.

* cited by examiner

| Channel | Time slot | | | | | |
|---|---|---|---|---|---|---|
| | 1 | 2 | 3 | 4 | 5 | 6 |
| 1 | B to D | C to B | C to E | | | E to C |
| 2 | A to C | | A to B | | D to B | B to A |
| 3 | | | D to F | B to C | | |
| 4 | | E to D | | | C to A | F to D |
| 5 | F to E | | | D to E | E to D & F | |

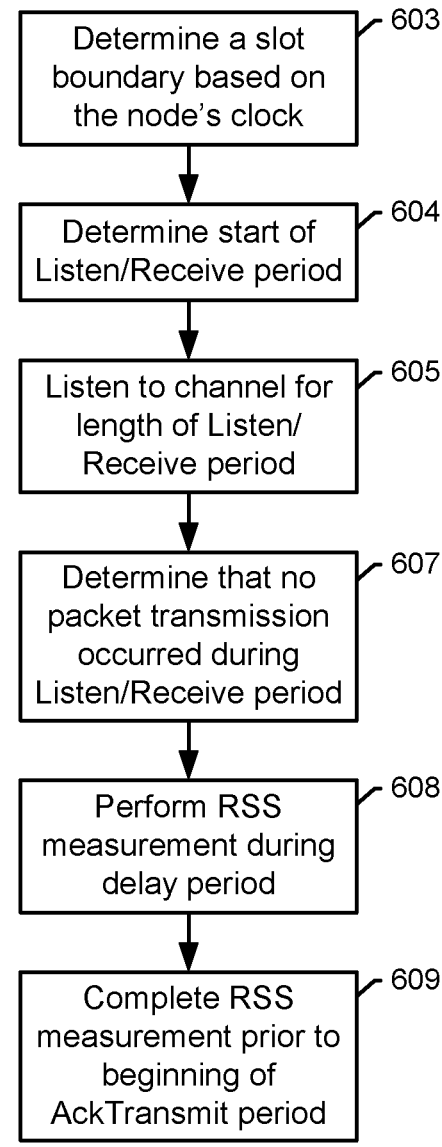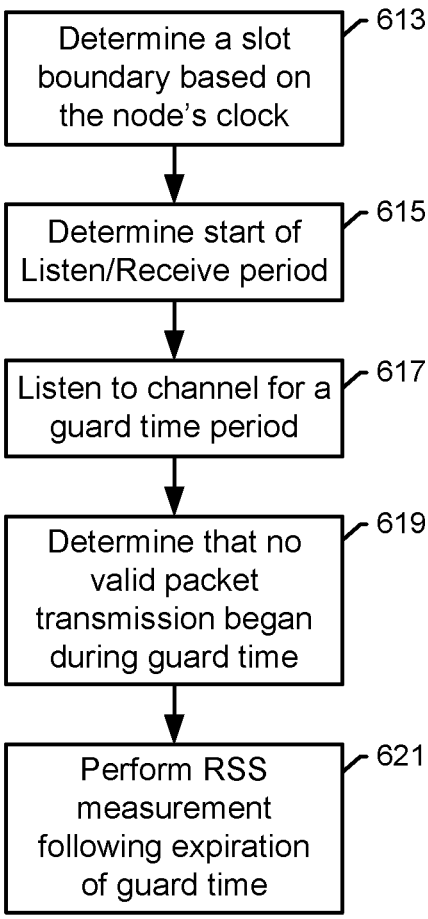

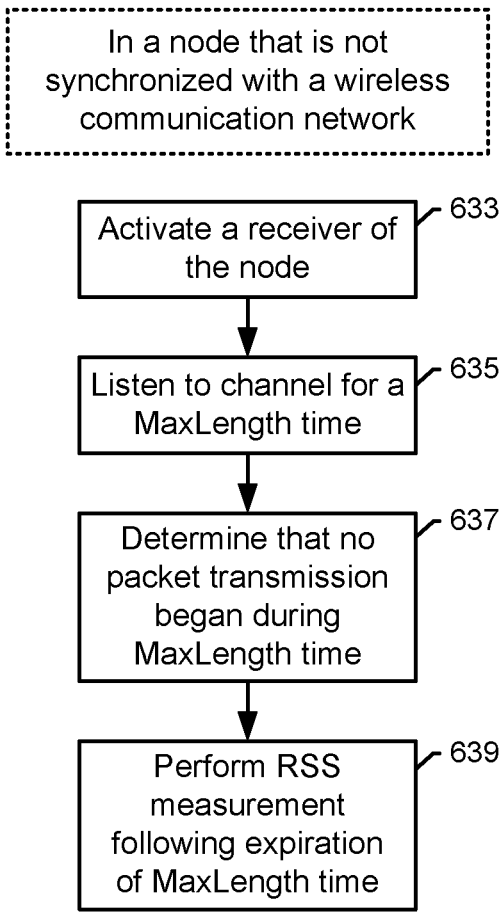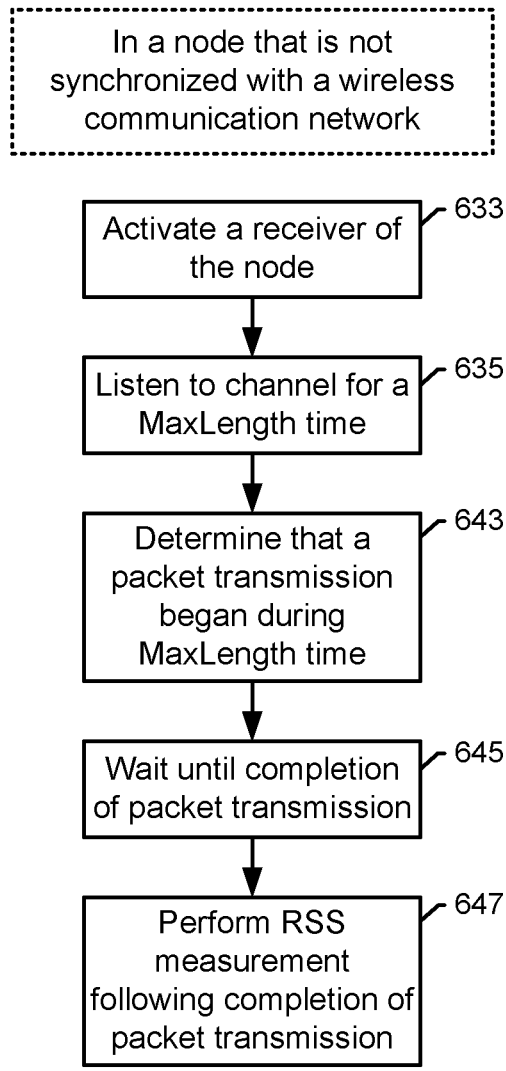

MONITORING OF CHANNEL STABILITY AND INTERFERENCE IN WIRELESS NETWORKS

CROSS-REFERENCE TO RELATED APPLICATIONS

The present application claims the benefit of priority under 35 U.S.C. § 120 as a continuation of U.S. patent application Ser. No. 13/866,751 entitled "Monitoring of Channel Stability and Interference in Wireless Networks" and filed on Apr. 19, 2013, the disclosure of which is hereby incorporated by reference in its entirety for all purposes.

TECHNICAL FIELD

The present subject matter relates to techniques and equipment to monitor the performance and stability of channels of a wireless network at nodes of the wireless network.

BACKGROUND

Wireless networks are composed of devices locally generating data for remote destinations. Wireless nodes typically use wireless communication (e.g., radio transmission) to send their data to a central computer system, which accumulates the data and builds it into a larger picture. In some wireless network systems, communication among nodes is organized as a set of links, scheduled in time into a communications superframe. Each link identifies at least one node scheduled to transmit a packet during a scheduled time interval, and optionally at least one node scheduled to listen for and receive a packet during the interval. A communications scheme organized in this way saves power by minimizing the total time each node needs to have its transmitter and/or receiver powered on. The network can use several different superframes for operation, and each superframe can be designed for a different communication need (e.g., system startup, normal operation, node diagnostics, emergency purposes). Nodes can individually switch among superframes as necessary or nodes can have multiple superframes operating concurrently.

Data and control packets flow through wireless networks along paths determined based on routing graphs. The routing graphs are used to determine routes for propagating the packets from node to node through the wireless network. Wireless nodes have finite output power and hence are limited to a certain communication range. As a result, communication across the network from a source node to a remote destination node may require several retransmissions of the packet along a path through one or more intermediate nodes. Each transmission/retransmission is called a hop, and each hop passes the packet from a sender node to a receiver node. Each unordered node pair between which it is possible to exchange packets in a network is called a path. A routing graph identifies which paths are valid for a next hop of a packet's route to a destination node.

The fraction of packets transmitted by the sender that are properly received by the receiver and acknowledged on a path is called the path stability. To ensure adequate levels of performance, diagnostics are kept to quantify path stability throughout the network. The only way to certainly measure path stability is to send packets and see what fraction is acknowledged. Wireless performance on paths varies with time so it is expected that path stability changes and frequent packet sending is required to maintain an up-to-date measure of path stability.

SUMMARY

The teachings herein provide techniques and equipment to monitor the performance and stability of channels of a wireless network at nodes of the wireless network.

In accordance with one inventive concept, a method for evaluating stability of a channel in a node of a wireless communication network is provided. In response to transmitting a first packet to another node of the wireless communication network on a selected channel of a plurality of channels of the wireless communication network, a first counter of a first plurality of counters of the node is incremented, wherein each counter of the first plurality of counters is associated with a different channel of the plurality of channels and the first counter is associated with the selected channel. A second packet is received from the other node, the second packet being an acknowledgment packet received in response to transmitting the first packet. In response to receiving the second packet, a channel of the wireless communication network associated with the second packet is determined. A second counter of a second plurality of counters each associated with a different channel of the plurality of channels is incremented, wherein the second counter is associated with the determined channel. A stability metric for the selected channel of the wireless communication network is computed based on values stored in the first and second counters.

In accordance with another inventive concept, a method for measuring interference on a channel of a wireless communication network in a node of the wireless communication network is provided. A receiver of the node listens during a predetermined time-period to a selected channel of the wireless communication network. A determination is made as to whether a packet transmitted across the wireless communication network is received during the predetermined time-period on the selected channel. Upon determining that no packet transmitted across the wireless communication network is received during the predetermined time-period on the selected channel, a received signal strength (RSS) is measured on the selected channel at an end of the predetermined time-period.

In one example, the node is synchronized with the wireless communication network and is scheduled, in accordance with a schedule of the wireless communication network, to listen to the selected channel during the predetermined time-period. In the one example, the predetermined time-period is measured according to a beginning of a time-slot of the wireless communication network. In another example, the predetermined time-period is a time-period having a length corresponding to a guard time of the wireless communication network, the node is synchronized with the wireless communication network, and the predetermined time-period is measured according to a beginning of a time-slot of the wireless communication network. In yet another example, the predetermined time-period is a time-period having a length of a maximum packet-length time-period of the wireless communication network, the node is not synchronized with the wireless communication network, and the predetermined time-period starts from a start time that is not synchronized with the wireless communication network.

In accordance with another inventive concept, a method for measuring interference on a channel of a wireless communication network in a node of the wireless communication network is provided. A receiver of the node listens during a predetermined time-period to a selected channel of the wireless communication network. A determination is made as to whether a packet transmitted across the wireless communication network is received during the predetermined time-period on the selected channel. Upon determining that a packet transmitted across the wireless communication network is received during the predetermined time-period on the selected channel, a received signal strength (RSS) is measured on the selected channel following completion of the transmission of the packet on the selected channel.

In one example, the node is not synchronized with the wireless communication network, and the predetermined time-period is a time-period having a length of a maximum packet-length time-period of the wireless communication network. In another example, the packet transmitted across the wireless communication network is a broadcast packet transmitted to a plurality of nodes on the selected channel.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 is a block diagram showing an illustrative communications superframe for a time-synchronized wireless network.

FIGS. 6A-6E are flow diagrams showing steps of various methods for measuring interference or noise on a channel of a wireless network.

DETAILED DESCRIPTION

Figure 1:
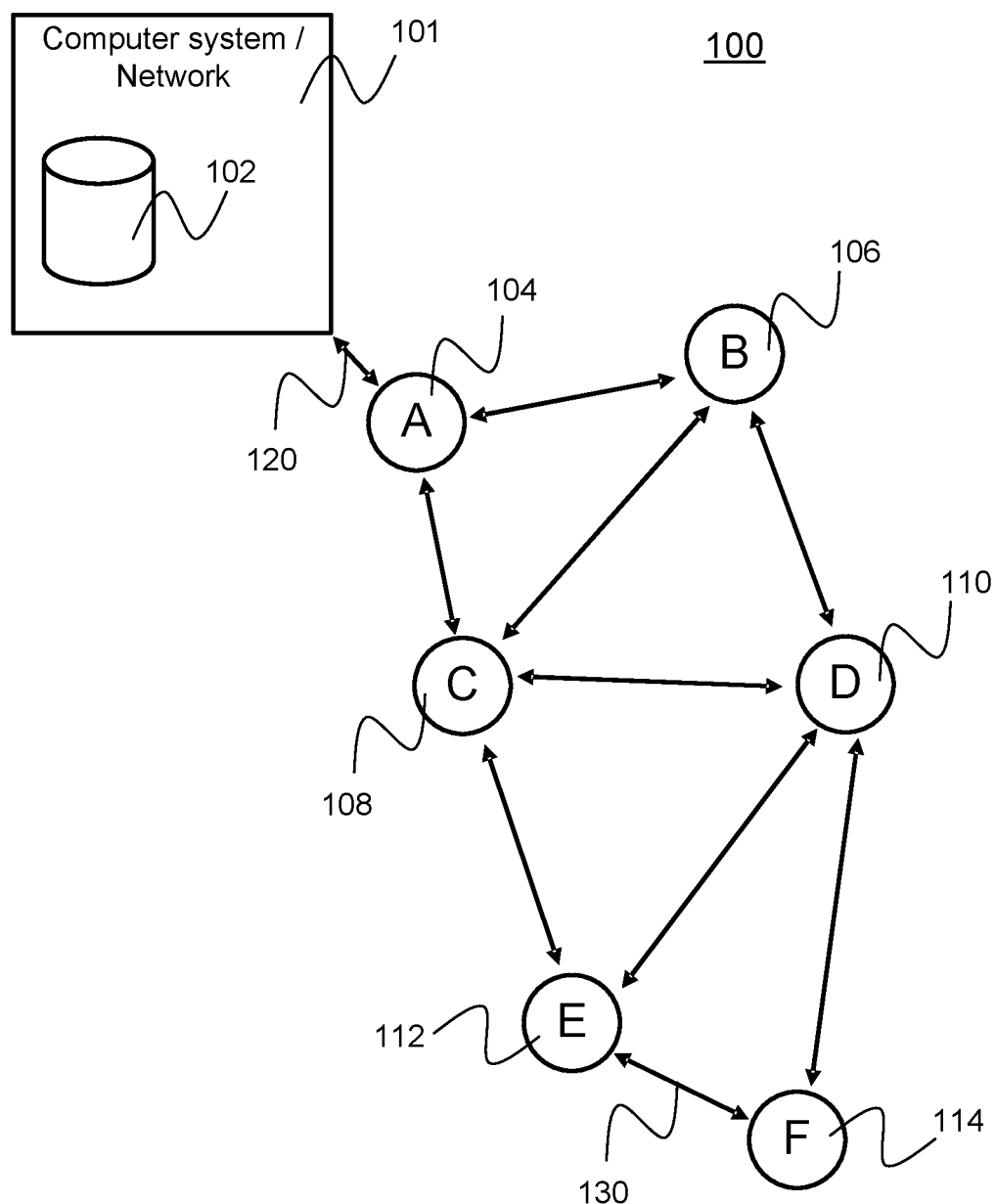
FIG. 1 is a block diagram showing an illustrative wireless network.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to evaluating the stability of a communication channel from a node in a wireless communication network. The various methods and systems disclosed herein further relate to evaluating channel performance, including measuring interference and noise, in a node of a wireless communication network.

A node of a wireless communication network is operative to, upon transmitting a first packet to another node of the wireless communication network on a selected channel of a plurality of channels of the wireless communication network, increment a first counter of a first plurality of counters each associated with a different channel of the plurality of channels, wherein the first counter is associated with the selected channel. The node receives a second packet from the other node, the second packet being an acknowledgment packet received in response to transmitting the first packet. In response to receiving the second packet, the node determines a channel of the wireless communication network associated with the first packet, and increments a second counter of a second plurality of counters each associated with a different channel of the plurality of channels, wherein the second counter is associated with the determined channel. In turn, the node computes a stability metric for the selected channel of the wireless communication network based on values stored in the first and second counters. In one example, the node transmits a reporting packet including the computed stability metric to a manager of the wireless communication network. In another example, the node adjusts a communication parameter of the node based on the computed stability metric, the communication parameter being selected from among a superframe structure and a routing graph.

A node of the wireless communication network is additionally, or alternatively, operative to cause a receiver of the node to listen during a predetermined time-period to a selected channel (e.g., wireless network frequency, or range of frequencies) of the wireless communication network, and upon determining that no packet transmitted across the wireless communication network is received during the predetermined time-period on the selected channel, measure a received signal strength (RSS) on the selected channel at an end (or immediately following an end) of the predetermined time-period. In one example, the node is synchronized with the wireless communication network and is scheduled, in accordance with a schedule of the wireless communication network, to listen to the selected channel during the predetermined time-period. In another example, the predetermined time-period is a time-period having a length corresponding to a guard time of the wireless communication network, wherein the node is synchronized with the wireless communication network and the predetermined time-period is measured according to a beginning of a time-slot of the wireless communication network. In another example, the predetermined time-period is a time-period having a length of a maximum packet-length time-period of the wireless communication network, the node is not synchronized with the wireless communication network, and the predetermined time-period starts from a random start time that is not synchronized with timing of the wireless communication network. The node can, alternatively, cause a receiver of the node to listen during a predetermined time-period to a selected channel of the wireless communication network, and upon determining that a packet transmitted across the wireless communication network is received during the predetermined time-period on the selected channel, measure a received signal strength (RSS)

on the selected channel following completion of the transmission of the packet. In one example, the node is not synchronized with the wireless communication network, and the predetermined time-period is a time-period having a length of a maximum packet-length time-period of the wireless communication network. In another example, the packet transmitted across the wireless communication network is a broadcast packet transmitted to a. plurality of nodes on the selected channel.

Reference now is made in detail to the examples illustrated in the accompanying drawings and discussed below. FIG. 1 is a block diagram showing an illustrative wireless network 100. The wireless network 100 includes a plurality of wireless network nodes 104, 106, 108, 110, 112, and 114. The wireless network 100 can further include a computer system 101 configured to communicate, via a connection 120 with an access point node 104 among the plurality of wireless network nodes, with various nodes of the wireless network. The connection 120 may be a wired or a wireless connection, and/or a direct connection between the computer system 101 and the access point node 104 or an indirect connection through a local area network, a wide area network, the Internet, or any other appropriate network. The wireless network 100 may include one or more access point nodes such as node 104, and one or more of the access point node(s) may function as gateway node(s) for the wireless network 100. The computer system 101 includes a memory or storage 102, and is generally capable of processing packets and data received through the wireless network 100 and of transmitting packets and data through the wireless network 100. The wireless network 100 can include a network manager, which may be implemented by the computer system 101, the access point node 104, or another appropriate node or system, which is involved in registering nodes to be part of the network, setting a communication schedule of the network, synchronizing network nodes, or the like.

The wireless network nodes (104, 106, 108, 110, 112, and 114) of the wireless network 100 are interconnected by a plurality of communication links. A communication link exists between any pair of nodes that can communicate directly between each other, for example by receiving messages, packets, or data transmitted by the other node and/or transmitting messages, packets, or data to the other node, For example, direct communication links exist between node 104 and node 106 and between node 104 and node 108, indicating that direct communication is possible between those node pairs. However, direct communication links may not exist between node 104 and nodes 110, 112, or 114, potentially because the physical distance between the nodes exceeds a maximum communication distance of the nodes, because noise, interference, and/or physical obstacles hinder direct and reliable communication between the nodes, or the like.

As shown in FIG. 1, node 104 is linked to nodes 106 and 108; node 106 is linked to nodes 104, 108, and 110; node 108 is linked to nodes 104, 106, 110, and 112; node 110 is linked to nodes 106, 108, 112, and 114; node 112 is linked to nodes 108, 110, and 114; node 114 is linked to nodes 110 and 112. Communication link 130 represents the communication link between nodes 112 and 114. In some embodiments, the nodes communicate between each other using radio frequencies that are in the 900-930 MHz or 2.45 GHz industrial, scientific, and medical (ISM) radio band. In some embodiments, the wireless network is compatible with IEEE standard 802.15.4 which relates to low rate wireless personal area networks.

Communications, including packets, data, and other messages, are routed through the network 100 from one node to another node along the communication links between the nodes. In one example, a data packet is routed from one node to another node using source routing, where an ordered list of nodes is transmitted with the data packet indicating the nodes through which the data packet is to be forwarded from a source node to a destination node. When a node receives a source routed data packet, the node forwards the packet to the next node in the source route. When the data packet reaches the destination node at the end of the source route, the destination node transmits an acknowledgement back to the originating node, implicitly acknowledging that the packet has traversed the entire route successfully. Use of a source routed packet allows data included in the packet to be communicated to a specific destination node, or more generally to a subset of nodes (i.e., the nodes along the source route) in a specific order. If a source routed packet cannot reach the end of the source route, a source route failure packet is sent back to the packet source instead of an acknowledgement. This failure packet allows the source to try another source route or a different mechanism for reaching the destination.

In some examples, the wireless network 100 is a synchronized network in which the clocks of the various network nodes (e.g., 104, 106, 108, 110, 112, and/or 114) are synchronized to within a maximum time-offset between clocks. Each clock is used to determine slot boundaries between time-slots in the corresponding node, and to determine a time at which the node can transmit a packet or listen for a packet to be received. The timing of communications (e.g., communications associated with transmitting a packet, and/ or communications associated with receiving a packet) in the node is thus performed with respect to the determined slot boundaries.

In some examples, communications between nodes in a time-synchronized wireless network 100 are coordinated to prevent multiple nodes from transmitting on a same channel at a same time. The communications can be coordinated according to a superframe, which functions as a schedule for communications on the wireless network 100. FIG. 2 is a block diagram illustrating an illustrative communications superframe 200 for the wireless network 100. The superframe 200 identifies, for each time-slot and wireless channel in the superframe, a transmitting node of the network that is allowed to transmit a packet during the time-slot and on the channel should the transmitting node have a packet to transmit. The superframe can further identify, optionally, a particular receiving node that should listen for a packet during the time-slot and on the channel should a packet need to be transmitted to the receiving node. In some examples, multiple receiving nodes can be identified if the time-slot and channel are to be used to broadcast a packet to the multiple nodes.

In particular, the superframe divides the time base of the time-synchronized wireless network into synchronized units referred to as time-slots which are long enough for one transmission from a transmitting node to one or more receiving nodes to occur (and optionally, for one acknowledgment to be sent back from a receiving node to the transmitting node during the same slot). A global schedule coordinates all such communication in the network, so as to enable different multi-hop routes to be taken from source to destination depending on the neighbor assignments. Each time-slot used for communication can contain one or more communication links between sets of nodes. The superframe includes multiple time-slots forming a cycle (e.g., 6 different time-slots in the illustrative superframe 200 of FIG. 2), and periodically repeats once the multiple time-slots have elapsed.

The superframe further divides the bandwidth of the wireless network into a plurality of frequency bands or radio channels (e.g., 5 different channels in the illustrative superframe 200 of FIG. 2). Each channel of the superframe can be assigned to a different transmitting node during a time-slot, such that multiple communication links can be activated at once on separate channels. The superframe 200 can thus provide a communications schedule for a wireless communication network such as the wireless network 100 of FIG. 1.

In the illustrative example of FIG. 2, superframe 200 includes a series of six time-slots and five channels for a total of 30 cells. A given node generally transmits or receives on a single channel in any time-slot. Each cell may or may not be filled with one or more communication links. The set of communication links in superframe 200 allows any path in the wireless network 100 to be activated in either direction for one time-slot over the course of the cycle. In some embodiments, a node has multiple transmitters and/or receivers enabling multiple transmissions/receptions in a given time-slot.

The set of communication links in superframe 200 indicates which node is transmitting and which node(s) is/are listening on each communication channel in each time-slot. In the example of superframe 200, for time-slot 1 and channel 1, node B transmits to node D; for time-slot 1 and channel 2, node A transmits to node C; for time-slot 1 and channel 5, node F transmits to node E; for time-slot 2 and channel 1, node C transmits to node B; for time-slot 2 and channel 4, node E transmits to node D, for time-slot 3 and channel 1, node C transmits to node E; for time-slot 3 and channel 2, node A transmits to node B; for time-slot 3 and channel 3, node D transmits to node F; for time-slot 4 and channel 3, node B transmits to node C, for time-slot 4 and channel 5, node D transmits to node E; for time-slot 5 and channel 2, node D transmits to node B; for time-slot 5 and channel 4, node C transmits to node A; for time-slot 5 and channel 5, node E transmits to nodes D and/or F; for time-slot 6 and channel 1, node E transmits to node C; for time-slot 6 and channel 2, node B transmits to node A; and for time-slot 6 and channel 4, node F transmits to node D. For all other cells of superframe 200, no nodes are transmitting or listening.

While each channel in a superframe has been described as corresponding to a predetermined transmission frequency, each channel can more generally correspond to a pseudo randomly permuted transmission frequency, to a transmission frequency changing according to a predetermined schedule, or to a frequency determined in any other appropriate way.

In some embodiments, a time-slot/channel combination in a superframe is used to broadcast from a transmitting node to any node that can receive the broadcast. In some embodiments, for a time-slot/channel combination designated to transmit from node 'X' to be received by node 'Y' is also used to acknowledge the receipt of a message by transmitting an acknowledgement message from node 'Y' to be received by node 'X'.

Figure 3:
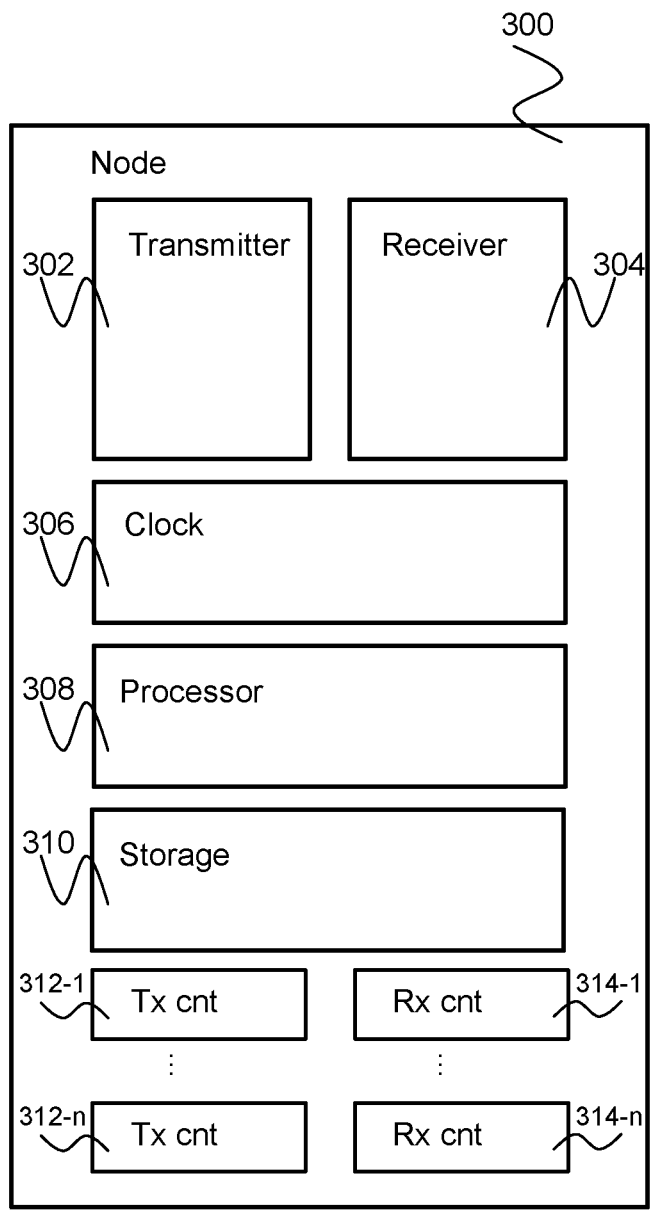
FIG. 3 is a block diagram showing an illustrative node of a wireless network.

FIG. 3 is a block diagram showing an illustrative wireless network node 300. Node 300 may correspond to any one of nodes 104, 106, 108, 110, 112, and/or 114 of the wireless network 100 of FIG. 1. Node 300 includes a transmitter 302 and a receiver 304 (or, alternatively, a transceiver which integrates transmitter and receiver functionalities), a clock 306, a processor 308, and a memory or storage 310. The transmitter 302 and receiver 304 enable the node 300 to communicate with other nodes and/or with other systems over wireless and/or wired links. In particular, the transmitter 302 and receiver 304 can select or tune to particular channels of a plurality of channels of the wireless network 100, so as to transmit, listen for, and/or receive communications over each channel when the channel is selected.

The transmitter 302 and/or receiver 304 may be configured to communicate using frequency modulated signals, phase modulated signals, amplitude modulated signals, time division multiplexing signals, code division multiplexing signals, signals compliant with the Institute of Electrical and Electronics Engineers (IEEE) 802.11 standard, signals compliant with the IEEE 802.15.4 standard, signals compliant with the Bluetooth protocol, signals compliant with the ultra wide bandwidth (UWB) standard, and/or signals encoded using any other appropriate scheme. Transmitter 302 and/or receiver 304 may be configured to communicate in any one or more of the medium frequency band, the high frequency band, the very high frequency band, the ultra high frequency band, or any other appropriate frequency band. For example, transmitter 302 and receiver 304 may communicate using the industrial, scientific, and medical (ISM) bands (e.g., 902-928 MHz, 2.400-2.500 GHz, 5.725-5.875 GHz, etc.).

The node 300 may further include first and second pluralities of counters 312 1-n and 314 1-n, wherein the first plurality of counters 312 1-n may generally be referred to as transmit counters 312 and the second plurality of counters 314 1-n may generally be referred to as receive counters 314. Each transmit counter 312 1-n is associated with a corresponding one of the plurality of n channels of the wireless network 100, and each receive counter 314 is similarly associated with a corresponding one of the plurality of n channels of the wireless network 100. Each transmit counter and each receive counter is used to keep track of the number of packets transmitted or received, respectively, on the corresponding channel. As such, when a packet (or other unit of communication between nodes) is transmitted from the node 300 on a selected channel, the transmit counter associated with the selected channel i (e.g., counter 312-i, wherein i is an integer between 1 and n) is incremented. In turn, when an acknowledgment packet (ACK) is received in response to the transmitted packet, the node determines the channel i on which the transmitted packet was sent, and the receive counter associated with the determined channel (e.g., counter 314-i) is incremented. In turn, the processor 308 computes a stability metric for the selected channel based on values stored in the first and second counters.

Imperfect (<100%) path stability is expected on most links and paths in a wireless network, and is generally assumed to be symmetric (e.g., packets transmitted from node A to node B are assumed to have the same success rate as packets transmitted from node B to node A). Because of this symmetry, path stability is generally discussed as a property of a path instead of an ordered pair of nodes. Packets transmitted are expected to be unacknowledged sometimes and retry mechanisms are built into wireless network protocols to re-send unacknowledged packets. When acknowledgements are present, a node not receiving an acknowledgement can retry the transmission on the same or a different path for a pre-determined finite number of times. Packets that are not acknowledged (e.g., broadcast packets) generally do not share the same retry mechanism.

Figure 4:
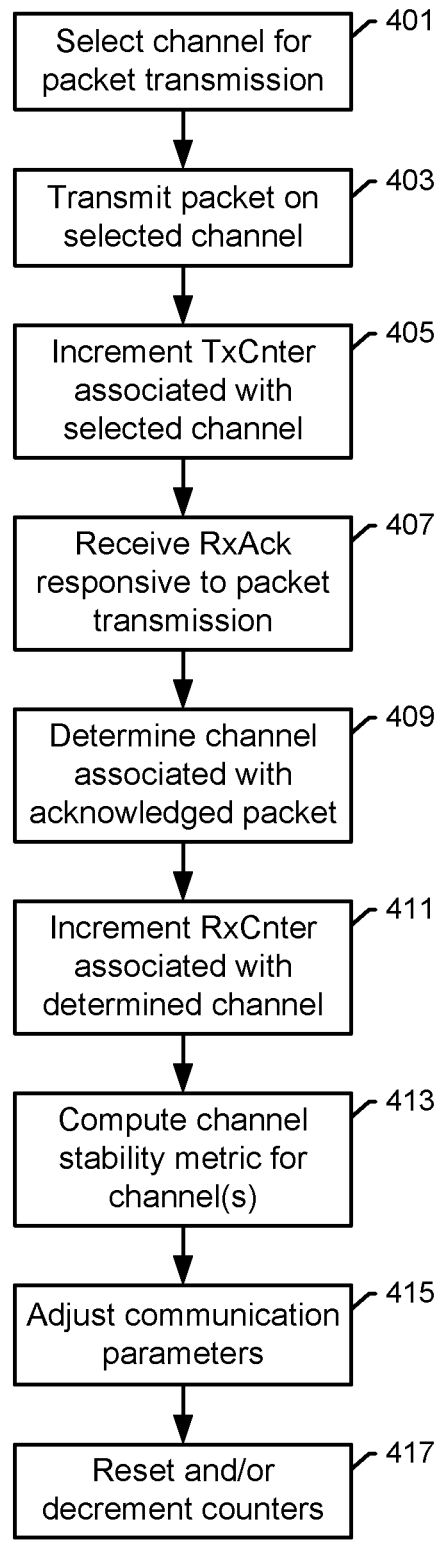
FIG. 4 is a flow diagram showing steps of a method for measuring the stability of a communication channel at a node of a wireless communication network.

FIG. 4 is a flow diagram showing steps of a method 400 for measuring the stability of a communication channel at a node of a wireless communication network using transmit and receive counters(e.g., 312 and 314) of the node. Steps of method 400 may be implemented on a node such as node 300 based on instructions stored in non-transitory memory/storage 310, such that processor 308 executes the instructions and controls the transmitter 302, receiver 304, transmit counters 312, and receive counters 314 to perform steps of the method.

The method 400 begins at step 401 with the selection of a channel for transmitting a packet from the node over the wireless communication network. The packet is generally a data packet or other packet that is being communicated through the network as part of normal network operation. The channel is thus generally selected based on a superframe of the wireless network, an intended destination of the packet, and information on a current and/or future time-slot of the wireless network. The channel may alternatively be selected based on the identity of channel(s) for which a path stability metric is to be computed or updated, for example in situations in which the packet is a packet used specifically for evaluating path stability in the network.

Once the channel is selected, the packet is transmitted on the selected channel in step 403, and a transmission counter 312-i is incremented in the transmitting node in step 405. In general, the transmission counter 312-i that is incremented is a transmission counter that is associated with the selected channel. Note that the transmission counter is generally incremented only in response to transmissions of unicast packets or other packets of types that are acknowledged, For example, broadcast packets are generally not acknowledged by receiving nodes and a transmission counter 312-i may thus not he incremented when a broadcast packet (or other packet of a type not configured to receive an acknowledgment of receipt) is transmitted on channel i. The node may thus determine whether the transmitted packet is of a type whose receipt is acknowledged, and increment the counter only if the packet is of such a type.

If the transmitted packet is successfully received by a receiving node, the receiving node is operative to transmit an acknowledgment of receipt back to the transmitting node. As a result, if an acknowledgment of receipt is received in response to the packet transmission in step 407, processing continues to steps 409-417.

In step 409, the channel associated with the acknowledged packet is identified. The channel can be identified based on a channel identifier included in the acknowledgment packet and identifying the channel on which the transmitted packet was transmitted and received; based on an identifier for the transmitted packet that is included in the acknowledgment packet and is used to retrieve from a memory of the node information on the channel on which the transmitted packet was communicated; based on a channel on which the acknowledgment packet was received, for example in a situation in which the acknowledgment packet is transmitted on the same channel as the transmitted packet; or the like.

Once the channel is identified, a receive counter 314-i is incremented in the transmitting node in step 411. In general, the receive counter 314-i that is incremented is a receive counter that is associated with the identified channel.

The node can optionally compute channel stability metric(s) for the channels based on values stored in the transmit and receive counters 312 and 314 in step 413. The metrics can be computed in response to completing step 411, on a periodic basis, or in response to receiving a request for channel stability metric(s) (e.g., from a user, a network administrator, or a network manager). A channel stability metric can correspond, for example, to a share of transmitted packets that are successfully received on a particular channel i, and can be computed by calculating the ratio of the values stored in counters 314-i and 312-i each associated with channel i.

In step 415, communication parameters of the node can be adjusted based on the channel stability metric(s). For example, a superframe can be adjusted such that a channel exhibiting a very low success rate (e.g., a very low share of transmitted packets being successfully received) is no longer used for packet transmission from the node. Conversely, the superframe can be adjusted such that a channel exhibiting a very high success rate is preferentially used for packet transmissions from the node. Alternatively, the node can avoid transmitting packets on a channel exhibiting a low success rate, with or without adjusting the superframe, for example by waiting for a next appropriate time-slot/channel combination to transmit a packet on instead of using a time-slot/channel combination using the channel having a low success rate.

Additionally or alternatively, the count values stored in the counters 312 and 314, the computed stability metric, and/or any adjustment to communication parameter(s) can be communicated from the node to a neighboring node, to a network manager, or to another entity requesting or using such information. In one example, a neighboring node may be notified that the node will avoid transmitting packets on a channel exhibiting a low success rate, such that the neighboring node can thereinafter discontinue listening for communications from the node on the channel during time-slots in which the node is scheduled to transmit on the channel. The notification sent from the node to the neighboring node can further include a request for the neighboring node to avoid transmitting packets to the node on the channel(s) identified in the notification. By avoiding transmissions on the channel, and/or discontinuing to listen to the channel, the node and/or its neighbor can reduce power consumption. In another example, a network manager may adjust a superframe of the wireless network based on the stability information received from nodes in the network, and propagate the adjusted superframe back to the nodes so as to cause the nodes to operate according to the adjusted superframe. In the other example, in response to the network manager receiving stability information from multiple nodes in the network indicating that a particular channel exhibits a low success rate, the network manager may blacklist the particular channel and send one or more control packet(s) to instruct all network nodes to stop transmitting or listening for packets on the particular channel or to perform another adjustment to the nodes' communication parameters. The network manager may alternatively or additionally generate a superframe that does not use the particular channel for sending to the nodes, and/or instruct the network nodes to use the superframe that does not use the particular channel. The channel stability information may be transmitted to neighboring node(s) and/or to a network manager as part of a health report packet, the packet preferably including information for a plurality of the channels (e.g., in the form of a. two vectors, each vector including entries corresponding to the count values of one of the plurality of transmit counters 312 and the plurality of receive counters 314).

In general, the receive and transmit counters 312 and 314 may store values corresponding to the total number of packets transmitted and received on an associated channel since the node was powered up or since the node joined the network. However, the receive and transmit counters 312 and 314 may be decremented or reset such that the counters store values corresponding to the total number of packets transmitted and received during a particular time period. For example, the counters 312 and 314 may be periodically reset (e.g., every 5 seconds; prior to the beginning of every 20th cycle or superframe; or the like) in step 417, such that the counters store values corresponding to the total number of packets transmitted and received since the beginning of the current time period (i.e., since the beginning of the period starting at the periodic reset time). The counters 312 and 314 may alternatively be reset in step 417 in response to particular environmental circumstances, such as in response to receiving a reset command from a network manager, a network gateway, or other entity, in response to transmitting a health report packet, or the like. The counters may alternatively store values corresponding to the total number of packets transmitted and acknowledged during a time-period having a fixed length ending at the current time instant (e.g., the number of packets transmitted and acknowledged during the previous 5000 milliseconds (ms)), and may thus be decremented appropriately in step 417 in order to store such total numbers.

In situations in which an acknowledgment of receipt is not received within a predetermined timeout period in step 407, processing may loop back to step 401 for processing of a next packet transmission from the node. Alternatively, even if no acknowledgment is received, processing may proceed to steps 409-417 to compute stability metrics reflecting the fact that no acknowledgment of receipt was received.

In some situations, a negative acknowledgment (NACK) of receipt may be received in step 407, the NACK indicating that the transmitted packet was not successfully received by the receiving node. In response to receiving the NACK packet, the receive counter 312-i is generally incremented and processing proceeds to step 409. The receive counter 312-i may be incremented because the receipt of the NACK packet is indicative of the channel being sufficiently stable for at least portions of the packet to have been transmitted successfully to the destination node. In some examples, however, in response to receiving a NACK packet, the receive counter 312-i is not incremented and processing can loop back to step 401 and/or proceed to steps 409-417 to compute one or more stability metrics.

The foregoing descriptions of FIGS. 3 and 4 have identified the counters of the pluralities of counters 312 and 314 as being associated with various channels of the wireless communication network 100. More generally, however, the counters can be associated with particular channels and destination nodes, such that a count value in a particular transmit counter 312 corresponds to a number of packets sent on a particular channel to a particular destination node and a count value in a particular receive counter 314 corresponds to a number of acknowledgment packets received for packet transmissions on the particular channel to the particular destination node. In such an example, the number of counters on the node may be increased such that the total numbers of transmit and receive counters are equal to the product of the number of channels and the number of destination nodes with which the node can communicate. Stability metrics may then be used to determine whether a particular channel can be used to communicate with some destination nodes (which, for example, exhibit a relatively high share of transmitted packets being successfully received) but not other destination nodes (which, for example, exhibit a relatively low share of transmitted packets being successfully received).

As described above, the wireless network 100 can in some examples be a synchronized network in which the clocks of the various network nodes (e.g., 104, 106, 108, 110, 112, and/or 114) are synchronized to within a maximum time-offset between clocks. Each clock, once synchronized with the clock of a network manager and/or of another node in the network, is used to determine slot boundaries between time-slots in the corresponding node. The timing of communications (e.g., communications associated with transmitting a packet, and/or communications associated with receiving a packet) in the node is then performed with respect to the determined slot boundaries.

Figure 5:
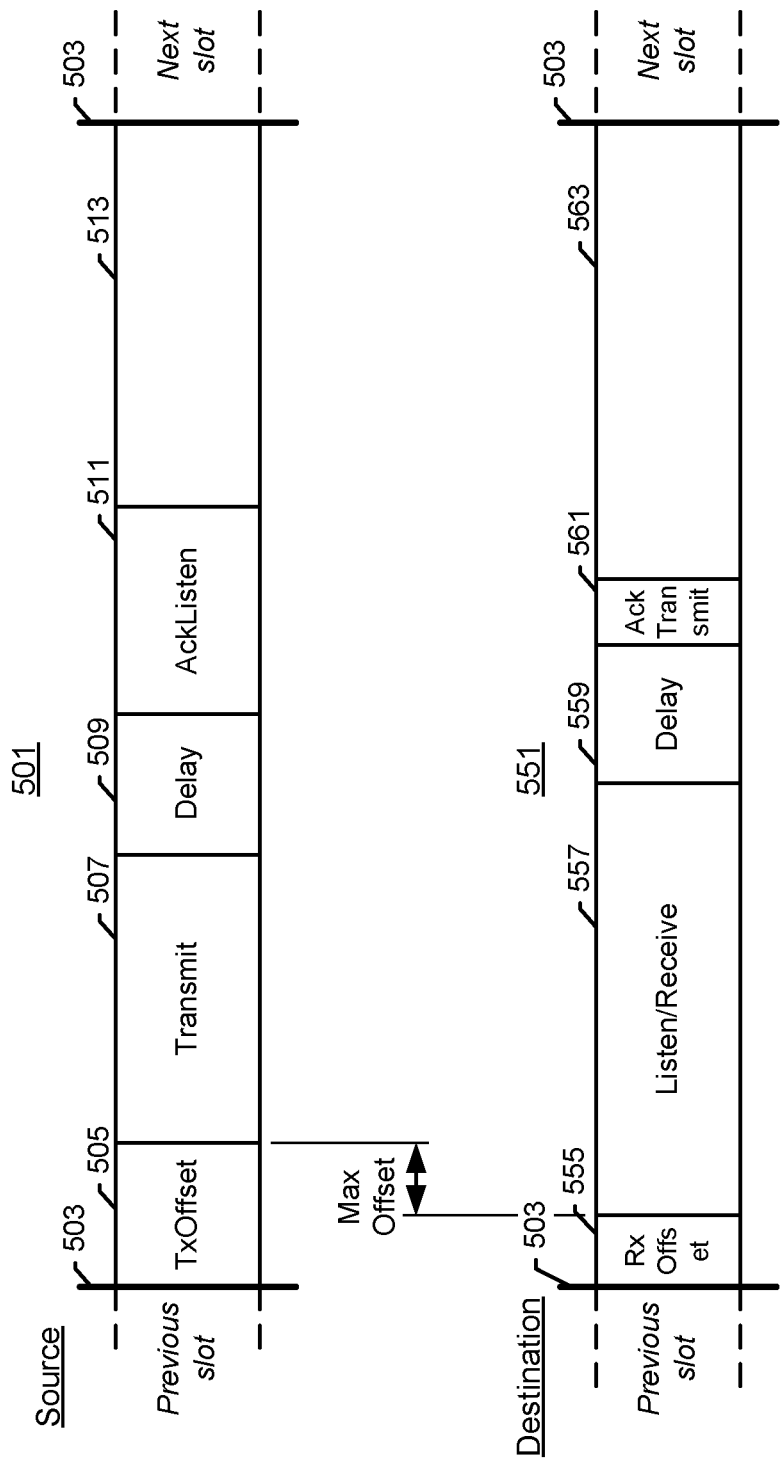
FIG. 5 is a timing diagram showing the timing of operations in a source node and a destination node during a time-slot for transmitting/receiving a packet.

FIG. 5 shows an illustrative timing diagram for operating a source node (e.g., a node acting as a transmitter) or a destination node (e.g., a node acting as a receiver) during an illustrative time-slot. Each node of the network 100 generally operates as a source node during some time-slots and as a destination node during other time-slots. During a particular time-slot, however, the node can operate as a source node, as a destination node, or the node can operate in a standby mode when the node is not scheduled to transmit or to receive any packet.

In a node operating as a source node, operation may proceed according to the timing diagram 501. In particular, following a slot boundary 503 marking the beginning of a time-slot, the node may standby for a first period of time TxOffset 505 prior to transmitting a packet during a Transmit period 507. The Transmit period 507 may have a length that is sufficient to complete the transmission of a packet (or other transmission unit). Following the end of the Transmit period 507, the node waits for a Delay period 509 prior to listening for an acknowledgment of receipt of the transmitted packet during an AckListen period 511, At the conclusion of the AckListen period 511, the node may standby during period 513 until the start of a next time-slot.

In a node operating as a destination node, operation may proceed according to the timing diagram 551. In particular, following a slot boundary 503 marking the beginning of a time-slot, the node may standby for a first period of time RxOffset 555 prior to beginning to listen for a packet during a Listen/Receive period 557. In one example in which the clocks of network nodes are synchronized to within a maximum offset MaxOffset, the Listen/Receive period 557 begins prior to the beginning of the Transmit period 507 by at least the MaxOffset time offset so as to ensure that a destination node is listening (in Listen/Receive period 557) at a time when a source node begins to transmit a packet (in Transmit period 507) even if the synchronization between the nodes is off by MaxOffset, The value of MaxOffset may more generally correspond to the sum of the maximum offset in clocks between two nodes and the maximum propagation delay of a signal between two nodes in the network. In the one example, the Listen/Receive period 557 may further extend by at least the MaxOffset time offset after the end of the Transmit period 507 so as to ensure that the destination node is listening (in Listen/Receive period 557) at a time when a source node ends transmission of a packet (in Transmit period 507) even if the synchronization between the nodes is off by MaxOffset. Following the end of the Listen/Receive period 557, the destination node waits for a Delay period 559 prior to transmitting an acknowledgment of receipt of the received packet during an AckTransmit period 561. The AckTransmit period 561 may have a length that is sufficient to complete the transmission of a packet acknowledgment (or other transmission unit), while the AckListen period 511 may begin at least MaxOffset prior to the beginning of the AckTransmit period 561 and extend until at least MaxOffset following the end of the AckTransmit period 561. At the conclusion of the AckTransmit period 561, the node may standby during period 563 until the start of a next time-slot.

A node of the communication network 100 may be configured to measure noise or interference in the wireless network by measuring a received signal strength (RSS) at the node during a period of time when no transmissions are expected in the wireless network. The noise or interference measurements can be performed for a particular channel by measuring the RSS on the particular channel when no transmissions are expected on the particular channel (and independently of whether transmissions are expected on other channels).

FIGS. 6A-6E show illustrative flow diagrams of methods for measuring noise or interference at a node in a wireless network. The node can, in particular, measure noise or interference on a particular channel of the wireless network. Steps of the methods 601, 611, 631, 641, and 651 of FIGS. 6A-6E may be implemented on a node such as node 300 based on instructions stored in non-transitory memory/storage 310, such that processor 308 executes the instructions and controls the transmitter 302, receiver 304, transmit counters 312, and receive counters 314 to perform steps of the methods.

In one example, a node that is scheduled to operate as a destination/receiving node during a particular time-slot can measure noise or interference during the particular time-slot (e.g., a time-slot of a superframe in which the node is identified as a destination node). In particular, and as shown in FIGS. 5 and 6A, the node may be configured to perform the RSS measurement during the delay time period 559 following a Listen/Receive time period 557. According to the method 601 of FIG. 6A, the node is synchronized with the wireless network and is thus operative, in step 603, to determine a slot boundary based on the node's clock. Based upon the slot boundary, the node determines the beginning of the Listen/Receive period 557 (step 604), and listens to the channel for the length of the Listen/Receive period 557 (step 605). In particular, the node waits until the Listen/Receive period 557 has elapsed prior to performing the RSS measurement, so as to perform the RSS measurement during the delay period 559 (step 608). The node is operative to complete the RSS measurement prior to the beginning of the AckTransmit period 561 (step 609), so as not to interfere with any transmissions on the network. As a result, the node is configured to perform the .RSS measurement following the end of the Listen/Receive period 557 during which a packet may be received, and before the beginning of the AckTransmit period 561 during which an acknowledgment signal may be transmitted by the destination/receiving node, i.e. during the delay period 559 during which neither the destination/receiving node nor the source/transmitting node is configured to transmit any signal on the network. In one example, the RSS measurement is performed in step 608 only if no valid packet is received during the Listen/Receive period 557, as determined in step 607. In the one example, if a valid packet is received during the Listen/Receive period 557 (in step 605), the node may need to use the delay period 559 to activate its transmitter (in view of transmitting an acknowledgment message during period 561) and the node may thus not be able to remain in a receiving mode to perform the RSS measurement during period 559. If no valid packet is received (step 607), the RSS measurement may be extended into or alternatively be performed during the AckTransmit period 561 because no acknowledgment packet need he transmitted during period 561. Thus, a node that is scheduled to receive and actually receives a packet during the time-slot may not be able to perform the RSS measurement immediately following the receipt of the packet because the receiving node will be switching from a listen mode to a transmit mode for transmitting an acknowledgment packet during the time at which the RSS measurement would be performed.

In another example, any node in the wireless communication network, including nodes that are not scheduled to be destination/receiving nodes during a particular time-slot, may be configured to perform an RSS measurement on a channel during the particular time-slot. According to method 611 of FIG. 6B, a node that is synchronized with the wireless network is operative, in step 613, to determine a slot boundary based on the node's clock. Based upon the slot boundary, the node determines the start of the Listen/Receive period 557 (step 615), and listens to the channel for a guard time period starting from the start of the Listen/Receive period 557. The node is not scheduled to be a destination/receiving node during the time-slot, but nonetheless listens for a guard time following the beginning of the Listen/Receive period 557 to determine whether a valid packet begins transmission on the channel during the guard time. Upon determining that no valid packet begins transmission during the guard time (step 619), the node can perform an RSS measurement in step 621. In general, the RSS measurement begins at the conclusion of (e.g., substantially immediately following the expiration of) the guard time. In wireless networks in which packet transmissions begin with a particular pre-amble indicating the beginning of a valid packet, the node can determine that no valid packet has begun transmission by determining that no valid pre-amble has been received on the channel. The guard time may correspond to a time interval measured from the beginning of the Listen/Receive period 557 and having a length corresponding to two times the MaxOffset period plus the length of time between the beginning of a valid transmission and the end of the pre-amble indicating the beginning of a valid packet. The guard time is generally shorter than the length of the Listen/Receive period 557. If no valid packet transmission begins or is detected during the guard time, the node determines that no packet transmission will take place during the time-slot. The node can therefore use the time-slot to perform the RSS measurement without interference from valid transmissions in the wireless network.

A node that is not synchronized with a wireless network can also perform an RSS measurement according to the method 631 illustratively shown in FIG. 6C. The node can perform the RSS measurement by activating a receiver of the node (step 633) at a random start time (e.g., a time that is not synchronized with any activity on the wireless network), and listening to radio traffic on a selected channel for a period having the length of time MaxLength of a maximum length packet (e.g., 4.3 ms in a Wireless HART compatible network) (step 635). Upon determining that no valid packet begins transmission on the channel during the MaxLength time period (step 637), the node can perform the RSS measurement following (e.g., immediately following) the expiration of the MaxLength time period (step 639). In general, the MaxLength time (e.g., 4.3 ms in a Wireless HART compatible network) is longer than the guard time (e.g., 2.2 ms in a Wireless HART compatible network).

According to the method 631 of FIG. 6C, the RSS measurement is only performed if no valid packet transmission is detected during the MaxLength time period (e.g., in step 637). However, more generally, if a valid packet transmission is detected during the MaxLength time period, method 641 of FIG. 6D can be used to perform the RSS measurement. Method 641 begins with steps 633 and 635 that are substantially identical to the corresponding steps of method 631. However, upon detecting a valid packet transmission during the MaxLength time period (step 643), the node waits until completion of the transmission of the valid packet (step 645) and performs the RSS measurement immediately following the completion of the packet transmission in step 647. By performing the RSS measurement immediately following the completion of the packet transmission, the node performs the RSS measurement during a latter part of the Transmit period 507 or during the delay period 509 shown in timing diagram 501 of FIG. 5, i.e. during periods in which the wireless network channel carries no transmissions. Thus, even if the node is not synchronized with the network, the node can perform the RSS measurement during a latter part of the Transmit period 507 or during the delay period 509 by performing the RSS measurement substantially immediately following the completion of a packet transmission.

Figure 6E:
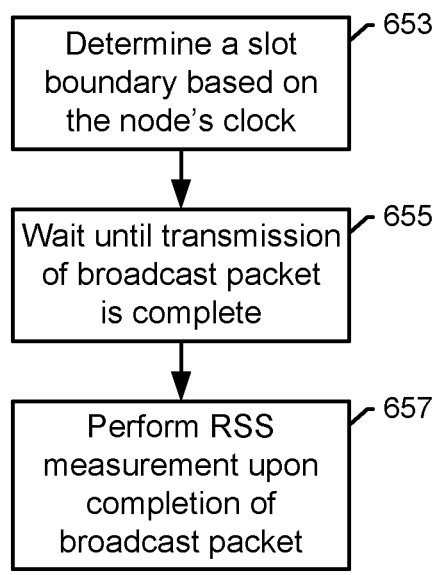

FIG. 6E shows steps of an illustrative method 651 for performing an RSS measurement during a time-slot that is scheduled to hold a broadcast transmission from a source node to a plurality of destination nodes. Such broadcast time-slots may be time-slots that are scheduled to occur periodically within a superframe, or time-slots that occur periodically or aperiodically outside of a superframe structure. In one example, the broadcast time-slot is a discovery time-slot of a network operating according to the Wireless HART protocol, wherein the broadcast time-slot is scheduled to occur every 10.24 seconds. According to method 651, the node determines a slot boundary based on the node's clock in step 653. The node waits until transmission of the broadcast packet is complete on the selected channel in step 655. The node may determine that the transmission is complete by detecting an end-of-packet identifier in the transmission, or by waiting until the expiration of the Transmit period 507 during which the broadcast transmission is scheduled to take place. Because broadcast packets are transmitted from one node to a plurality of nodes, the broadcast packets are not acknowledged by any of the plurality of receiving nodes. Hence, following receipt of the broadcast packet, the node can determine that the transmission of the broadcast packet has completed and perform the RSS measurement in step 657.

The inventive concepts can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way, Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment, Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for evaluating stability of communication channels in a wireless communication network, the method comprising steps of:

monitoring, by a first node of the wireless communication network, a plurality of communication channels utilized for communications between the first node and other nodes in the wireless communication network according to a specified network communication schedule for the wireless communication network;

computing, by the first node, channel stability metrics for each of the plurality of communication channels;

initiating, by the first node, in coordination with at least another node of the wireless communication network and based on the computed channel stability metrics for each of the plurality of nodes, a change in a usage of a communication channel of the plurality of communication channels by:

transmitting a reporting packet, including the computed stability metric, from the first node to a manager of the wireless communication network; and receiving at the first node, from the manager of the wireless communication network, a control packet for causing the first node to adjust a communication parameter by one of: adjusting a superframe structure of the network communication schedule, and adjusting a routing graph of the wireless communication network to discontinue the usage of the selected communication channel.

2. The method of claim 1, wherein the initiating the change in the usage of the selected communication channel comprises:

discontinuing transmission of packets by the first node on the selected communication channel of the wireless communication network.

3. The method of claim 1, wherein the initiating the change in the usage of the selected communication channel comprises:

transmitting a reporting packet by the first node to at least one neighbor node of the first node in the wireless communication network, to cause the at least one neighbor node to stop transmitting packets to the first node on the selected communication channel of the wireless communication network.

4. The method of claim 1, wherein the computed channel stability metrics include a rate at which packets are successfully communicated to or from the first node on each of the plurality of communication channels, and the method further comprises discontinuing usage of the selected communication channel subject when the selected communication channel has a low rate at which packets are successfully communicated to or from the first node.

5. The method of claim 1, further comprising:

incrementing, by the first node, a first transmit counter of a plurality of transmit counters in response to a first packet being transmitted from the first node to a second node of the wireless communication network using a first communication channel of the plurality of communication channels, each of the plurality of transmit counters being associated with a different communication channel of the plurality of communication channels and the first transmit counter being associated with the first communication channel;

in response to receiving an acknowledgement that the first packet was received by the second node, determining a second communication channel of the wireless communication network associated with the second packet and incrementing a second receive counter of a plurality of receive counters, each of the plurality of receive counters being associated with a different communication channel of the plurality of communication channels and the second receive counter being associated with the second communication channel; and computing the channel stability metric for the first communication channel of the wireless communication network based on incremented values stored in the transmit and receive counters.

6. The method of claim 5, wherein the second channel of the wireless communication network associated with the second packet is a channel that the second packet is received on.

7. The method of claim 5, wherein the second channel of the wireless communication network associated with the second packet is a same channel as the first communication channel on which the first packet is transmitted.

8. The method of claim 5, wherein the second packet is one of an acknowledgment (ACK) or a negative acknowledgment (NACK) packet.

9. The method of claim 5, further comprising:

determining whether the first packet transmitted to the second node of the wireless communication network is of a type of packet whose receipt is acknowledged, wherein the first transmit counter is incremented only upon determining that the first packet is of a type of packet whose receipt is acknowledged.

10. The method of claim 5, wherein the second receive counter is incremented only when the second packet is received.

11. The method of claim 1, wherein each communication channel corresponds to a different frequency band used for communication in the wireless communication network.

12. The method of claim 1, wherein the first node is configured to transmit packets to multiple different other nodes of the wireless communication network on a particular communication channel of the plurality of communication channels of the wireless communication network.

13. The method of claim 1, wherein the first node is configured to transmit packets to a second node of the wireless communication network on multiple different communication channels of the plurality of communication channels of the wireless communication network.

14. A wireless network node in communication with other wireless network nodes across a wireless communication network, the wireless network node comprising:

a transceiver that transmits and receives packets on selected communication channels of a plurality of communication channels of the wireless communication network according to a specified network communication schedule for the wireless communication network; and a processor that controls operation of the transceiver to monitor the plurality of communication channels and to compute, for each respective communication channel of the plurality of communication channels, a channel stability metric for the respective communication channel, wherein the processor initiates, in coordination with at least another node of the wireless communication network and based on the computed channel stability metrics for each of the plurality of communication channel, a change in a usage of a communication channel of the plurality of communication channels by:

causing the transceiver to transmit a reporting packet, including the computed stability metric to a manager of the wireless communication network; and receiving through the transceiver from the manager of the wireless communication network, a control packet for causing the wireless network node to adjust a communication parameter by one of: adjusting a superframe structure of the network communication schedule of the wireless communication network, and adjusting a routing graph of the wireless communication network to discontinue the usage of the selected communication channel.

15. The wireless network node of claim 14, wherein the processor initiates the change in the usage of the selected communication channel by discontinuing transmission of packets on the selected communication channel of the wireless communication network.

16. The wireless network node of claim 14, wherein the processor initiates the change in the usage of the selected communication channel by causing the transceiver to transmit a reporting packet to at least one neighbor node of the first node in the wireless communication network to cause the at least one neighbor node to stop transmitting packets to the first node on the selected communication channel of the wireless communication network.

17. The wireless network node of claim 14, wherein each communication channel corresponds to a different frequency band used for communication in the wireless communication network, and the transceiver is configured to transmit and receive packets on any selected frequency band of a plurality of frequency bands of the wireless communication network.

18. A wireless network node configured for communication with other wireless network nodes of a wireless communication network across a plurality of communication channels, the wireless network node comprising:
means for monitoring the plurality of communication channels utilized for communications between the wireless network node and the other wireless network nodes in the wireless communication network according to a specified network communication schedule for the wireless communication network;
means for computing channel stability metrics for each of the plurality of communication channels; and
means for initiating, in coordination with at least another node of the wireless communication network and based on the computed channel stability metrics for each of the plurality of communication channels, a change in a usage of a communication channel of the plurality of communication channels, the means for initiating comprising:
means for transmitting a reporting packet, including the computed stability metric to a manager of the wireless communication network; and
means for receiving from the manager of the wireless communication network, a control packet for causing the wireless network node to adjust a communication parameter by one of: adjusting a superframe structure of the network communication schedule of the wireless communication network, and adjusting a routing graph of the wireless communication network to discontinue the usage of the selected communication channel.

19. The method of claim 1, wherein the wireless communication network is time synchronized and the specified network communication schedule comprises a plurality of time slots.

20. The wireless node of claim 14, wherein the wireless communication network is time synchronized and the specified network communication schedule comprises a plurality of time slots.

* * * * *